United States Patent

[11] 3,594,042

| [72] | Inventor | Donald E. Gauch |
| | | Grundy Center, Iowa |
| [21] | Appl. No. | 821,921 |
| [22] | Filed | May 5, 1969 |
| [45] | Patented | July 20, 1971 |
| [73] | Assignee | Mid Equipment Corporation |
| | | Grundy Center, Iowa |

[54] SWINGING CYLINDER TRUCK HOIST
4 Claims, 4 Drawing Figs.

[52] U.S. Cl. .................................................. 298/22 D
[51] Int. Cl. .................................................. B60p 1/16
[50] Field of Search .......................................... 298/22, 19, 20, 10, 11

[56] References Cited
UNITED STATES PATENTS

| 2,640,725 | 6/1953 | Dale | 298/22 P |
| 3,172,703 | 3/1965 | Dyer | 298/22 R |
| 3,363,944 | 1/1968 | Lablanche | 298/22 J |

FOREIGN PATENTS

| 621,956 | 6/1961 | Canada | 298/22 R |

*Primary Examiner*—Richard J. Johnson
*Attorney*—Birch, Swindler, McKie & Beckett ABSTRACT: This device permits an ordinary pickup truck to be modified for use as a lightweight dump truck. It includes a subframe to be mounted under the truck body and hydraulic cylinder linkage means interposed between the truck chassis and the subframe. The linkage serves to swing the hydraulic cylinder rearwardly and upwardly as it is expanded so a short hydraulic cylinder can be used rather than the conventional long cylinders. Further, when the cylinder is collapsed there is no concern over inadequate truck chassis clearance since the short cylinder rides far off the ground.

INVENTOR
DONALD E. GAUCH

BY *Hous, Birch, Swinkler & McKie*
ATTORNEYS

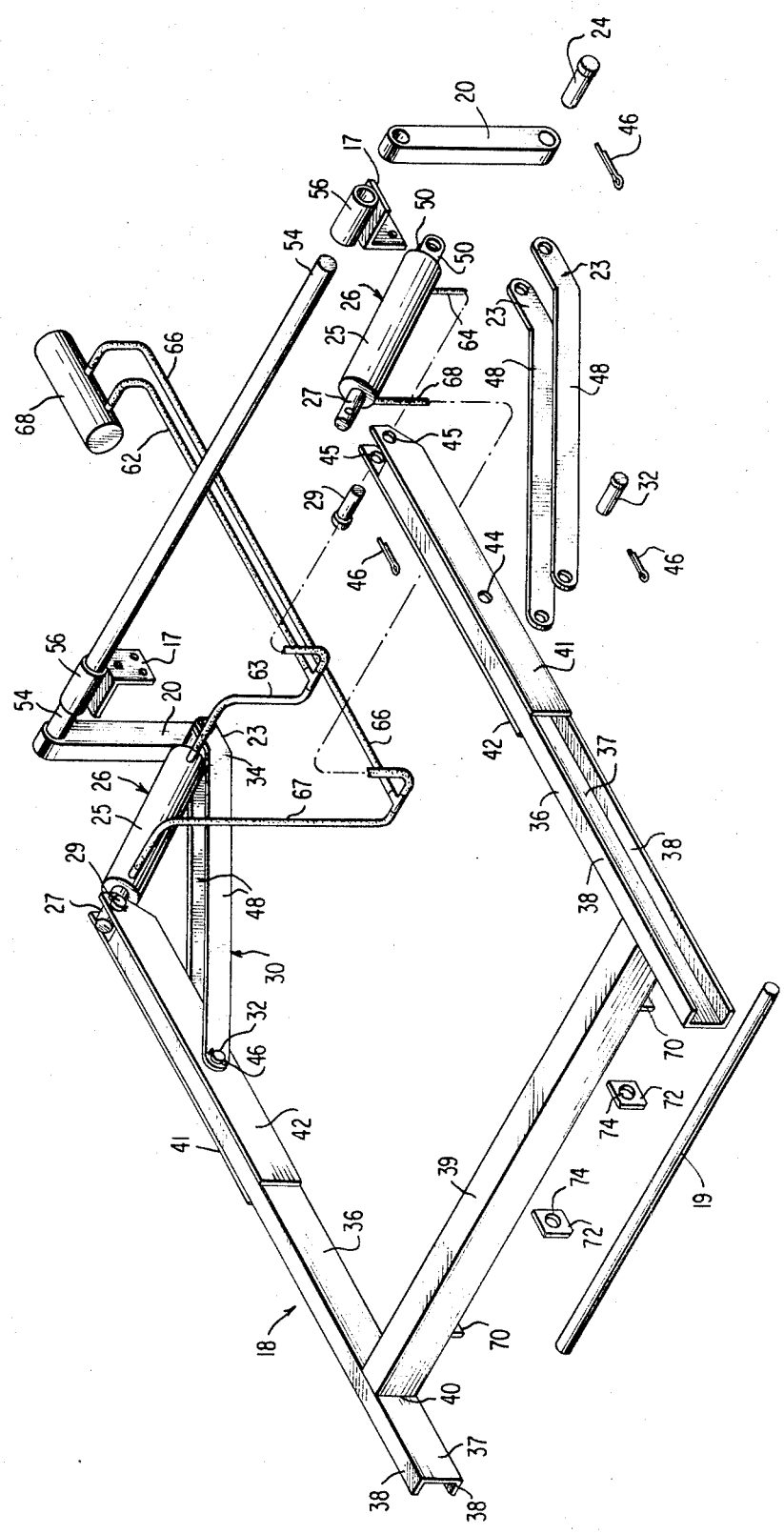

SWINGING CYLINDER TRUCK HOIST

BACKGROUND OF THE INVENTION

1. Field of the Invention

This invention relates to the art of dump trucks and more particularly to an apparatus for converting a conventional pickup truck to a lightweight dump truck.

2. Description of the Prior Art

Pickup trucks are generally small, light-duty vehicles. They include a cab and open truck body that are usually mounted on a chassis of about the same general size as that of an automobile chassis. Generally pickup trucks are used whenever there is a need for light hauling such as in business deliveries, farming and construction. On occasion it is desirable to have these pickup trucks haul materials in bulk such as sand or gravel. On the other hand, often it is desirable for persons operating in certain industries such as construction or farming to have a dump truck of the size and weight of an ordinary pickup truck. This is because when materials such as sand, gravel, feed or the like are handled in bulk, a pickup truck could be easily unloaded if it had a dump body.

Generally speaking, trucks that are of the size and weight of a pickup truck but incorporating the body dumping feature are unavailable.

This invention overcomes the deficiency noted above and makes its contribution to the art by providing a mechanism whereby an ordinary pickup truck can have its body converted from a fixed mounting on a chassis to a pivotal mounting so that it can be used as a dump truck. In addition, the invention disclosed herein presents an apparatus which permits the hydraulic cylinders used to swing the truck body into its dumping position to be shorter than would ordinarily be expected since the end of the cylinder that would be connected to the truck chassis is free to move upwardly and rearwardly upon expansion thereof.

SUMMARY OF THE INVENTION

In summary the invention includes an apparatus for pivoting a truck body relative to a truck chassis including elongated truck body means pivotally connected to the chassis for rotation about a horizontal axis; expansible means including a first end connected to the truck body means and a second end constrained for movement in a curvilinear path relative to the frame and elongated means interconnected between the truck body means and the second end, the elongated means being operative to drive the second end along the curvilinear path upon expansion of the expansible means.

BRIEF DESCRIPTION OF THE DRAWING

FIG. 4 is an exploded perspective view of the elements necessary for modifying a conventional pickup truck into a dump truck.

DESCRIPTION OF A PREFERRED EMBODIMENT

Figure 1:
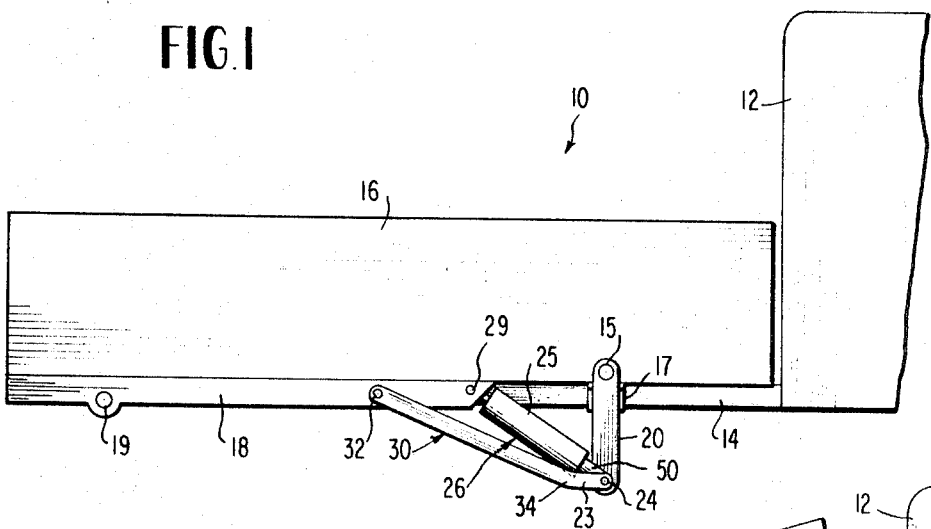
FIG. 1 is a side elevational view of a modified pickup truck with the truck body in its rest position.

The invention can best be described by referring to FIG. 1 wherein a pickup truck 10 of the type contemplated by this invention is illustrated. The truck is similar to a conventional pickup truck in that it is set relatively low to the ground and is relatively lightweight having a cab 12 with a rearwardly extending chassis 14 upon which rests the truck body. The chassis is supported at its front and rear by wheels as is well known.

A truck body 16 comprising an elongated, rectangular boxlike structure preferably having a hinged tailgate at its end is disposed on the chassis 14 immediately behind the truck cab 12. The truck body has its front end spaced slightly from the cab while preferably the end having the tail gate extends rearwardly beyond the chassis. It can be seen that a horizontally disposed axle 19 serves a pivot for the truck body to move relative to the chassis. An elongated frame means 18 comprising a plurality of structural members is rigidly connected to the underside of the truck body 16 to increase its strength and to provide a connection between the truck body and the chassis as will be more fully explained. It is seen in the drawing that frame means 18 extends from the rearmost portion of the truck body 16 to an intermediate portion thereof. Although this is considered to be adequate, if desired, additional reenforcing means in the form of elongated structural members can be extended forwardly of the terminus of frame means 18 to provide additional rigidity and strength to the floor of the truck body.

Since the swinging cylinder mechanism is essentially the same on both sides of the truck only the side illustrated in the figures will be discussed. However, it is to be understood that a description of the structure on the side illustrated is to also serve as a description of the other side.

A swing arm 20 comprising an elongated link member has one end connected to pivot means 15 carried by chassis 14. The swing arm 20 is fixed to pivot means 15 which is supported by a suitable bracket 17 welded to the chassis. At its opposite end swing arm 20 is connected by pivot pin 24 to the cylinder 25 of hydraulic actuator 26. The actuator includes an extensible piston rod 27 that has its free end pivotally connected by pin 29 to frame means 18. The juncture of piston rod 27 and frame means 18 is slightly closer to the front of the truck body than the rear thereof to provide sufficient leverage to rotate the body about pivot 19.

Pull arm 30 which includes a plurality of elongated members which will be described in greater detail herein has one end 23 connected to pin 24 at the juncture of swing arm 20 and hydraulic actuator 26 and has its other end connected by pin 32 to frame means 18 rearwardly of pin 29. Preferably pull arm 30 is provided with a dog leg 34 at end 23 so that when the truck body is in its collapsed position (FIG. 1) it can clear the cylinder 26.

Referring now to FIG. 4 the details of the aforementioned structural elements will be described. Frame means 18 comprises two elongated outwardly directed channel members 36, each including a web 37 and two outwardly directed flanges 38. The channel members are interconnected by at least one elongated cross brace 39 which preferably is a right-angle extrusion or forging having its open section facing forward and downward. The ends of the angle are welded at 40 to the inwardly facing webs 37 of the channels. Each channel member 18 has two elongated plates 41 and 42 welded to it on opposite sides. Plate 41 is welded across the tops of the flanges while plate 42 is welded directly to the web. The plates, which are all of the same size, extend from the midportion of each channel member to a short distance beyond their forward ends. An opening 44 is provided in the plates and web of each channel intermediate its ends to receive pin 32 whereby pull arm 30 is connected to the frame 18.

At their foremost ends, in the portion extending beyond the ends of the channel members, the plates are provided with a second opening 45 to receive pin 29 so that the free end of piston rod 27 can be connected to the frame 18. Each of pins 29 and 32 is held in position by suitable cotter pins 46.

Each pull arm 30 comprises two elongated straps 48 arranged on opposite sides of each channel member in facing relation to plates 41 and 42. At their opposite ends 23 straps 48 encompass the free end of swing arm 20 and are connected thereto by pin 24 which is held in position by cotter pin 46. Each of the actuator cylinders 25 has two ears 50 in spaced parallel relation connected to its closed end. The space between the ears 50 is wide enough to receive the end of swing arm 20 but narrow enough to fit between the two straps 48 that comprise the pull arm 30. At this point it should be noted that pin 24 connects the ends of actuator 26, swing arm 20, and pull arm 30 together so that they move together in an arc about pivot means 15 whose radius is swing arm 20.

Swing arm 20 is rigidly connected to pivot means 15 which comprises an elongated transverse rod 54 supported by bushings 56 on brackets 17 which are riveted or welded to the chassis 14. Each of the swing arms 20 is in fixed angular relation with respect to each other and rod 54 so both arms 20 and rod 54 always rotate through the same angle.

The hydraulic cylinders 25 are expanded in concert by hydraulic fluid flowing through a first flexible line 62 having flexible branches 63 and 64 connected to the closed end of each cylinder 25. The piston rods are retracted together by the weight of the truck body 16 pressing down on the elongated frame 18 or by the flow of hydraulic fluid in a second flexible line 66 having flexible branches 67 and 68 which are connected to the rod ends of the cylinders. Hydraulic lines 62 and 66 are connected to reservoir pump 68 which can be mounted on the truck chassis in any convenient location.

The frame means 18 which is pivotally connected to the truck chassis by the aforementioned horizontally disposed axle 19 includes a plurality of truck body pads 70. Each pad is a generally square member set on edge and welded against the leg and flange of crossmember 39. Each pad has a centrally disposed opening (not shown) to receive the aforementioned axle 19. The truck chassis carries a plurality of hinge pads 72 each comprising a generally square member having an opening 74 therein. The hinge pads are welded on their edges to the chassis 14. The truck body pads and the hinge pads are aligned so that horizontal axle 19 fits through their respective openings to form a pivot between the chassis 14 and the frame 18.

Figure 2:
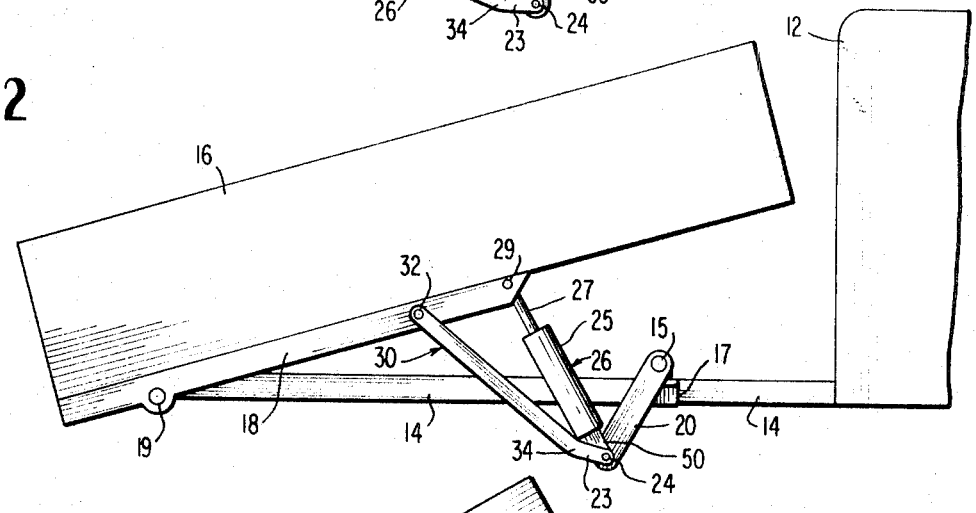
FIG. 2 is a side elevational view of the pickup truck of FIG. 1 with the truck body in an intermediate dumping position.
Figure 3:
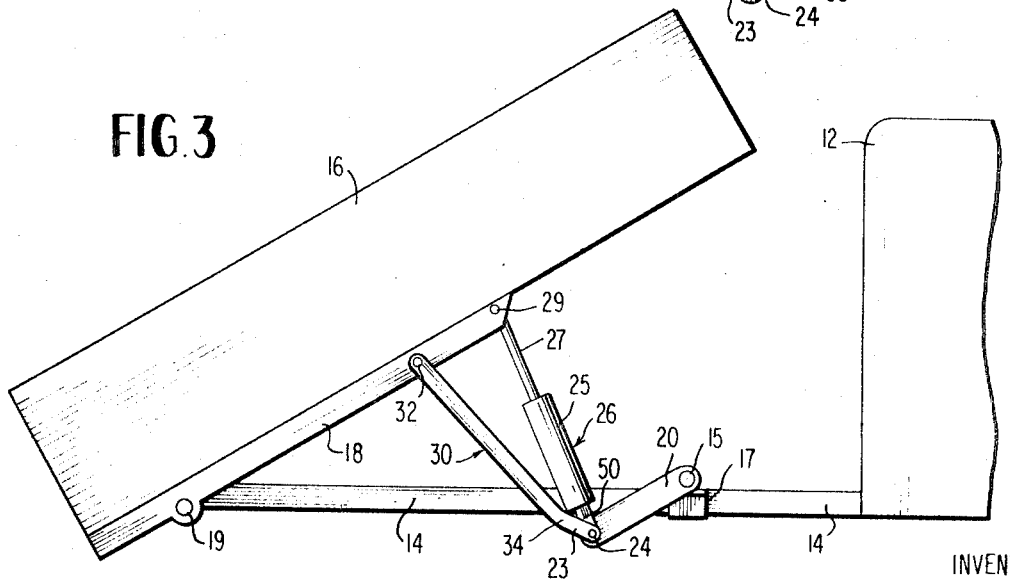
FIG. 3 is a side elevational view of the pickup truck of FIG. 1 with the truck body in its full dumping position.

The operation of the device can best be described by reference to FIGS. 1, 2 and 3. In FIG. 1 the truck body is shown in its normal position with the hydraulic actuators 25 reduced to their smallest dimension and the swing arms 20 are substantially vertical. The junctures of swing arms 20, pull arms 30 and actuators 26 are the lowest portion of the truck chassis. As fluid is introduced into the cylinders 25 and rods 27 expand, pull arms 30 since they are raised with frame 18, cause swing arms 20 to swing upwardly and rearwardly in an arc about transverse rod 54 which forms pivot means 15. Since the terminus of cylinders 26 is connected to swing arms 20 they are also drawn upwardly and rearwardly as the swing arms move in their arcuate path.

When actuators 26 are fully expanded (FIG. 3) pull arms 30 have drawn swing arms 20 and the terminus of cylinders 26 to approximately the same height as the truck chassis. It can be seen that the advantage of this device is that much smaller cylinders and piston rods can be used to achieve a dumping angle equivalent to that available by a cylinder with a conventional linkage. Further the smaller cylinders give increased ground clearance when the truck body is in its rest position (FIG. 1).

It is to be observed that while the invention described herein has been described with particular reference to a modification of an existing pickup truck body, it is to be understood that the invention is also contemplated for use where it is installed on general types of dumping vehicles and should not be limited only to modification of pickup trucks. Further, it should be understood that many modifications of this device would be obvious to those skilled in the art in light of the foregoing specification and drawings. Therefore, the scope of the invention should not be limited by the foregoing detailed description of a preferred embodiment but rather should be limited only by the scope of the claims appended hereto.

I claim:

1. In a truck of the type having a relatively low elongated chassis and an elongated body mounted on said chassis in fixed relation thereto, the improvement comprising:
    an elongated frame means adapted to be mounted on the underside of said truck body including two elongated beams disposed in spaced parallel relation to each other and disposed longitudinally of said body;
    means for pivotally connecting said elongated frame means to a horizontal axis on said chassis so that said body pivots about said axis relative to said chassis;
    expansible means including a first end connected to said frame means and a second end constrained for movement in a curvilinear path relative to said frame means;
    elongated means interconnected between said frame means and said second end mounted on said frame means intermediate the connection of said first end of said expansible means and said horizontal axis, said elongated means being operative to drive said second end upwardly and rearwardly toward said body along said curvilinear path upon expansion of said expansible means whereby said body is caused to pivot into a dumping position relative to said chassis; and
    link means having an end thereof pivotally connected to said chassis and having another end connected to said second end to constrain it for movement in an arcuate path relative to said chassis, said link means including elongated means pivotally supported on said chassis and extending transversely thereof and at least two elongated link members, each having one end connected to said pivotally supported means in spaced relation so that they are disposed on opposite sides of said chassis, each of said elongated link members being fixed in angular depending relation to said pivotally supported means for movement therewith.

2. In a truck as defined in claim 1 wherein
said expansible means includes at least two hydraulic cylinders, each of said cylinders having one end connected to one of said elongated beams and having its second end connected to said other end of said link member; and
said elongated means include at least two members, each of said members having one end connected to one of said elongated beams and having its other end connected to said second end so that upon expansion of said hydraulic cylinders said second end thereof swings upwardly and rearwardly in said arcuate path.

3. In a truck comprising:
    a relatively low elongated chassis providing a bed to support a load carrying body thereon;
    an elongated body pivotally connected on a horizontal axis to said chassis so that said body pivots about said axis relative to said chassis to discharge a load from said body;
    expansible means including a first end pivotally connected to said body and a second end constrained for movement in a curvilinear path relative to said body;
    elongated means pivotally connected at one end to said body and having a common pivotal connection with said second end of said expansible means to drive said second end along said curvilinear path upon expansion of said expansible means; and
    link means having an end thereof pivotally connected to said chassis and having the other end pivotally connected to the common pivotal connection between said elongated means and said second end of said expansible means whereby said body is caused to pivot into a dumping position relative to said chassis upon expansion of said expansible means.

4. In a truck as described as in claim 3 wherein
said expansible means includes hydraulic cylinder means.